United States Patent

[11] 3,608,603

| [72] | Inventors | Paul O. Pfeiffer<br>Cuyahoga Falls;<br>Frank J. Grucella, Akron, both of Ohio |
|---|---|---|
| [21] | Appl. No. | 662,362 |
| [22] | Filed | Aug. 22, 1967 |
| [45] | Patented | Sept. 28, 1971 |
| [73] | Assignee | The General Tire & Rubber Company |

[54] INNER TUBE
2 Claims, 4 Drawing Figs.

| [52] | U.S. Cl. | 152/349 |
|---|---|---|
| [51] | Int. Cl. | B60c 5/04 |
| [50] | Field of Search | 152/349, 342 |

[56] References Cited
FOREIGN PATENTS

| 1,016,772 | 1/1966 | Great Britain | 152/349 |
|---|---|---|---|
| 1,105,267 | 6/1955 | France | 152/349 |

Primary Examiner—Arthur L. La Point
Assistant Examiner—Richard A. Bertsch
Attorneys—Harry F. Pepper, Jr. and Frank C. Rote, Jr.

ABSTRACT: This invention relates to an improved inner tube for radial ply tires in which the ends of the tube, which are to be spliced together, lie at an acute angle with respect to the longitudinal axis of the tube.

PATENTED SEP 28 1971　　　　　　　　　　3,608,603

INVENTORS
P. O. PFEIFFER &
F. J. GRUCELLA
BY

ATTORNEY

INNER TUBE

BACKGROUND OF THE INVENTION

Inner tubes are used in pneumatic tires to prevent the escape of air from within the tire. These tubes are made of suitable elastomeric material which is highly impermeable to the passage of air. Although tubeless tires are very popular today, inner tubes are still in demand for several reasons. One of the primary reasons is that because of certain constructions of many types of rims, it is difficult to effectively seal a tubeless pneumatic tire. Therefore, an inner tube must be used for this purpose.

Through the years, there have been many different inner tube designs developed. These developments generally relate to two basic types of inner tubes. There is the endless or continuous chamber type which is made by joining the ends of an open-ended tubular elastomer. There is also the type which is made from a tubular elastomer which has closed ends, and these ends press against each other forming a noncontinuous pneumatic chamber. This latter form of tube has all but disappeared in recent times due to the difficulty in the producing such a tube to a satisfactory degree of dimensional uniformity.

Inner tubes characterized by an endless or continuous pneumatic chamber are typically prepared from a suitable elastomer which is compounded along with additives, curing agents, and the like. The elastomeric material is then extruded into tubular shape. Specific lengths of tubing are cut from this stock to the desired size. The open ends of the specific length are brought together and spliced to form a torus. The torus so formed is then inflated and vulcanized. The ends of the specific length of tubing from which the tube is formed are usually cut along lines perpendicular to the longitudinal axis of the tube.

It has been found that tubes made in this way experience a high rate of failure when employed in radial ply tires. This is because the line of splice lies in a common plane with the radial cords of the tire carcass, i.e., the plane along a radius of the tire. In a radial ply tire the cords of the innermost carcass ply extend from bead to bead radially of the tire, and therefore lie in planes along radii of the tire. Since an inner tube is formed by splicing ends which are cut perpendicular to the longitudinal axis of the tube, the line of juncture will lie in a common plane with a cord or cords of the innermost carcass ply. Since the splice and the cords lie in this common plane, the splice experiences a high degree of chafing due to cord flexing along approximately its entire length.

Recently, it has been discovered that if the splice of the tube can be made to lie at a substantial angle with respect to the cords of the radial ply tire, the above-mentioned high rate of failure may be overcome. Such a discovery has been disclosed in U.S. Pat. application Ser. No. 575,128, filed Aug. 25, 1966, assigned to the same assignee as the present invention. In this application, tubes are formed from a specific length of tubing, which has its ends cut at an acute angle with respect to the longitudinal axis of the tubing. The ends of the length are then brought together and spliced. It has been found that although tubes made in this way significantly decrease the tube failure problem in a radial ply tire, there is still some degree of failure. It has been found that failure most often occurs in the sidewall portions of the tube where the transverse edges of each cut end are joined.

SUMMARY OF THE INVENTION

It is an object of this invention to further reduce the rate of failure of inner tubes utilized in radial ply tires than has heretofore been accomplished.

It is a further object to provide a tube constructed in such a manner as to insure that the most likely points of failure along the tube splice will be in the base and crown portions of the tube.

It is another object to provide an inner tube formed from a piece of tubing with ends cut at an acute angle with respect to its longitudinal axis, wherein the transverse edges of each cut end will be joined in the base and crown portions of the tube.

It is still another object to provide a novel method of producing an inner tube which will satisfactorily perform when used in a radial ply tire.

Inner tubes made according to this invention are cut along spaced, parallel lines which lie at an acute angle to the longitudinal axis of the tube. The cut ends are brought together in such a way that the transverse edges of the cuts at each end of the tube will meet in the base and crown portion. This can be done by rotating the length of tubing 90° about its longitudinal axis, just before the ends are brought together for splicing. In this way, the parallel cuts made will be along lines extending from the base to the crown, rather than along lines from sidewall to sidewall.

PREFERRED EMBODIMENTS OF THE INVENTION

Figure 1:
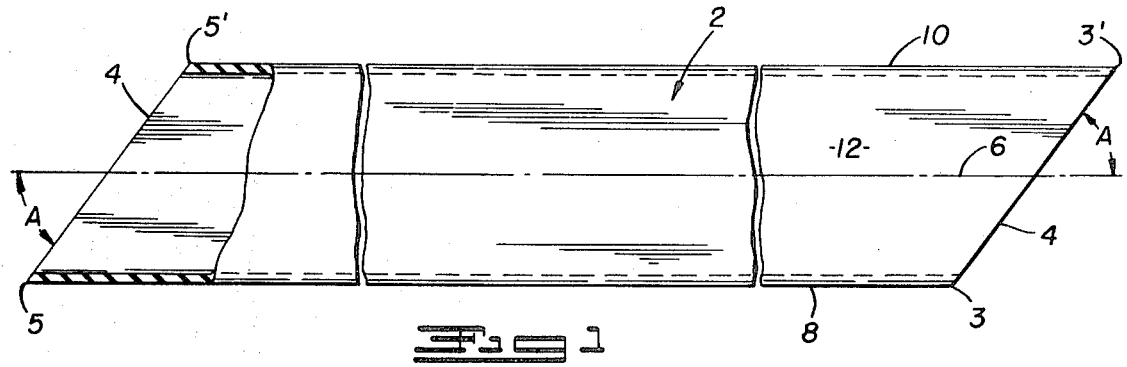
FIG. 1 shows a flat piece of rubber tubing with parts omitted and shown in section, with its ends cut according to the invention.

FIG. 1 shows a piece of rubber tubing 2 from which the improved inner tube of the invention is to be formed. The tubing has mutually parallel open ends 4, each cut along a line which forms an acute angle A with the longitudinal axis 6 of the tubing. The ends 4 are cut along or in other words, substantially parallel to a line extending from the base 8 to the crown 10, across both sidewall portions 12. The transverse edges 3', 5' of the cut ends are thus located in the crown 10, while the edges 3, 5 are located in the base portion 8. The tube is made of a material highly impermeable to air, such as butyl rubber. However, any suitable elastomeric material may be used which will give the desired degree of impermeability.

Figure 2:
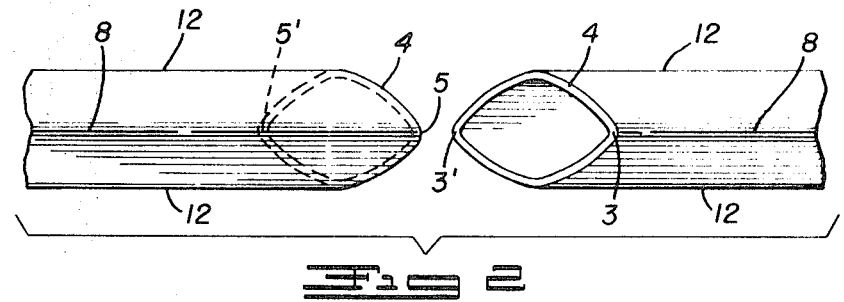
FIG. 2 shows a partial perspective view of the tube in FIG. 1, rotated 90° about its longitudinal axis, with its ends about to be joined for splicing.

After the desired length is cut from tubular stock as shown in FIG. 1, the ends 4 of the tube are folded around to meet as shown in FIG. 2. Before the ends 4 are brought together, the specific length of tubing 2 is rotated 90° about its longitudinal axis 6, so that the transverse edges 3, 5 and 3', 5' of each cut end will meet in the base portion 8 and crown portion 10, respectively.

Figures 3, 4:
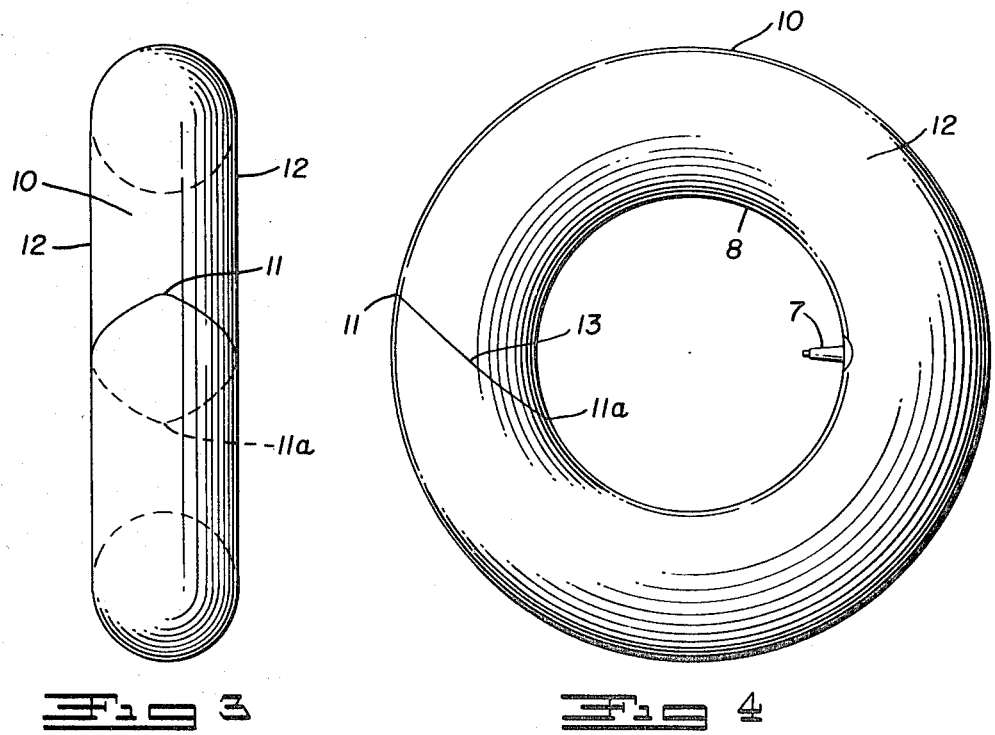
FIG. 3 shows an end view of an inner tube spliced according to the invention.
FIG. 4 shows a side view of the tube of FIG. 3.

The ends, when joined, will form a splice line as shown in FIGS. 3 and 4. In these Figures, it can be seen that the sharp, or V-shaped juncture points 11 and 11a of the splice will lie in the crown and base respectively. The lines of the splice across each sidewall portion 12 will be relatively straight. The valve means 7 is inserted whenever practical, usually before splicing. Because the maximum flex of the cords of a radial ply tire occur in the sidewalls, a tube constructed as herein described is less likely to fail at its splice in the sidewall.

The angle at which the ends are cut is preferably between 20° and 75° with respect to the longitudinal axis of the tube. An angle of approximately 25° has been found to be highly satisfactory.

The splicing of the ends may be accomplished by any known splicing procedure. The ends may be butt spliced in a manner similar to that shown in U.S. Pat. No. 2,675,854. In the alternative, the ends could be lap spliced to obtain the required strength at the juncture of the ends. The splice may also be reinforced along any part, or all of its length by various known procedures. For example, the splice may be reinforced with a single layer of rubber strip, or by reinforcing patches.

The inner tube shown in FIGS. 1 through 4 can be conveniently made by cutting desired length of tubing from a tubular stock using parallel cutter knives spaced from one another so that the distance between them represents the desired length of inner tube. One of the knives is preferably adjustable toward or away from the other so that any desired length of tubing may be readily cut. The knives are placed at the desired angle in relation to the longitudinal axis of the tube and the cuts are made. The tube is then rotated 90° about its longitudinal axis, the ends of the tube brought together, spliced, inflated, and vulcanized.

Modifications and variations of the present invention may be made without departing from the spirit and scope of the invention as it is represented by the preceding description.

What is claimed is:

1. A toroidal inner tube composed of a tubular elastomer with a radially inner base portion, a radially outer crown portion and radially extending sidewall portions between said base and crown portions, said tubular elastomer including a pair of conjugate, mutually parallel, open ends spliced one to the other, the improvement wherein each of sad ends is substantially parallel to a line from said base portion of said tubular elastomer to said crown portion of said tubular elastomer, said line forming an angle of between about 20° to about 75° with the longitudinal axis of said tube.

2. The structure as defined in claim 1, wherein said angle is approximately 25°.